Figure 1:
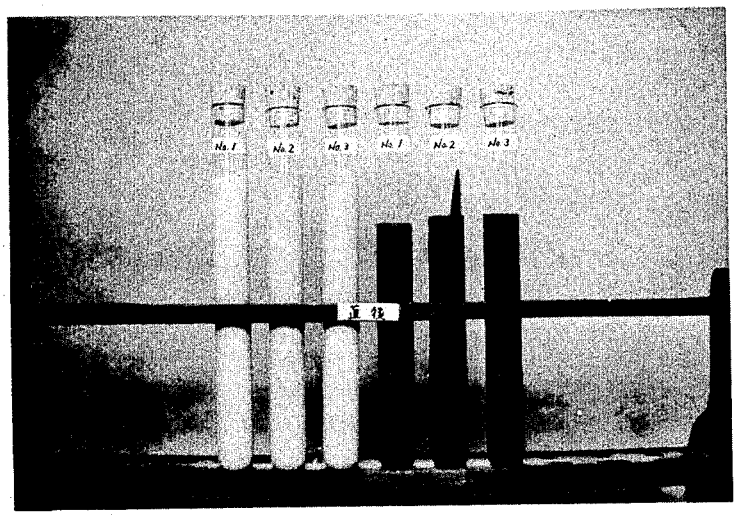

United States Patent [19]

Tanaka et al.

[11] 4,088,507

[45] May 9, 1978

[54] PHTHALOCYANINE PIGMENT COMPOSITIONS

[75] Inventors: Tuneo Tanaka; Sengo Ishizuka; Keniti Tokuda; Akimitsu Suzuki, all of Tokyo, Japan

[73] Assignee: Toyo Ink Manufacturing Co., Ltd., Tokyo, Japan

[21] Appl. No.: 791,279

[22] Filed: Apr. 27, 1977

[30] Foreign Application Priority Data

Apr. 30, 1976 Japan .................................. 51-48646

[51] Int. Cl.$^2$ ............................................... C08K 5/00
[52] U.S. Cl. ........................... 106/288 Q; 106/308 N; 106/308 Q
[58] Field of Search ............ 106/288 Q, 308 N, 308 S

[56] References Cited

U.S. PATENT DOCUMENTS

| 3,920,469 | 11/1975 | Kienzle et al. | 106/288 Q |
| 3,973,981 | 8/1976 | Miyatake et al. | 106/288 Q |

*Primary Examiner*—Winston A. Douglas
*Assistant Examiner*—J. V. Howard
*Attorney, Agent, or Firm*—Frank J. Jordan

[57] ABSTRACT

A copper phthalocyanine pigment composition consisting essentially of 100 parts by weight of copper phthalocyanine and 0.5 – 30 parts by weight of a copper phthalocyanine derivative having the following formula

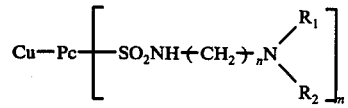

wherein Cu—Pc— is the residue of copper phthalocyanine, $m$ and $n$ are each an integer of 1 – 4, and $R_1$ and $R_2$ are each a substituted or non-substituted alkyl group or a heterocyclic group containing the nitrogen atom appearing in the formula.

3 Claims, 2 Drawing Figures

U.S. Patent

May 9, 1978

4,088,507

PHTHALOCYANINE PIGMENT COMPOSITIONS

This invention relates to excellently noncrystalline and non-flocculating copper phthalocyanine pigment compositions.

Copper phthalocyanine blue is a pigment widely used as a colorant since it has attractive color tone, great tinting strength, various excellent fastnesses and the like. However, it is still unsatisfactory in some properties depending on its uses.

As is generally known, copper phthalocyanine blue may be in β-form or α-form, the former being obtained as a yellowish blue pigment e.g. by triturating a crude copper phthalocyanine mechanically and the latter being obtained as a reddish blue pigment by dissolving or suspending a crude copper phthalocyanine and pouring the resulting solution or suspension in water for re-precipitation. These α-and β-type copper phthalocyanines have a disadvantage that they exhibit crystallization. More particularly, the β-type copper phthalocyanine pigment tends to further the growth of crystals thereof in an aromatic solvent or at a high temperature with the attendant of a decrease in tinting strength, while the α-type copper phthalocyanine pigment tends to cause its crystal transformation to the β-type simultaneously with its growth of crystals in β-form. Particularly, the transformation and growth of crystals occurring in the α-type copper phthalocyanine pigment will result in a change in color tone and a decrease in tinting strength and accordingly raise problems when the pigment is put to use.

Another serious disadvantage of copper phthalocyanine pigments is that they tend to flocculate. This tendency is particularly remarkable when the pigment is used in a non-aqueous low-viscous dispersion system such as a paint or gravure printing ink; the flocculation of the pigment in the system results in that the system exhibits remarkable structural viscosity as to its viscosity. In addition, the pigment will cause flocculation when used in admixture with pigments of other kinds in a paint and cause precipitation of the pigments and other undesirable problems. Both the α-type and the β-type copper phthalocyanine pigments tend to flocculate with this tendency being particularly remarkable with the former.

The α-type and β-type copper phthalocyanine pigments find various uses depending on their particular color tone and other properties; however, because of the aforementioned defects, the α-type copper phthalocyanine pigment is restricted in use in the preparation of non-aqueous low-viscous dispersion systems such as paints and gravure printing inks.

In order to eliminate such defects, there have heretofore been proposed some processes as illustrated hereunder. They include a process for incorporating copper phthalocyanine with a phthalocyanine of a different metal in large proportions as disclosed in Japanese Patent Gazettes 3534/58 and 12884/63, a process for incorporating a copper phthalocyanine pigment with a sulfonated copper phthalocyanine as disclosed in Japanese Patent Gazettes 3466/66 and 1711/69, a process for incorporating a copper phthalocyanine pigment with phthalimide methyl copper phthalocyanine as disclosed in U.S. Pat. No. 2,761,865, a process for treating the surface of particulate pigments with a colorless organic material as disclosed in U.S. Pat. No. 2,965,511, a process for mixing copper phthalocyanine with a copper phthalocyanine derivative obtained by the reaction of chloromethyl copper phthalocyanine with secondary, tertiary or quaternary amino groups as disclosed in Japanese Patent Gazettes 16787/64 and 2713/63, a process for incorporating copper phthalocyanine pigment with a copper phthalocyanine derivative obtained by the reaction of copper phthalocyanine with $SO_2X_2$ groups wherein X is a substituted or non-substituted alkyl or aryl group as disclosed in U.S. Pat. No. 2,861,005 and a process for mixing copper phthalocyanine pigment with a copper phthalocyanine derivative obtained by the reaction of copper phthalocyanine with $-SO_2NH-(CH_2)_n-NH-$ or $-CH_2NH-(CH_2)_n-NH-SO_2-O-$ groups as disclosed in U.S. Pat. No. 3,920,469.

These proposed processes were followed to confirm how satisfactory pigments could be obtained thereby with the result that a mixture of copper phthalocyanine pigment with a copper phthalocyanine derivative obtained by the reaction of chloromethyl copper phthalocyanine with secondary or tertiary amino groups was found excellent on the whole. The mixture, however, was such that it was improved in non-crystallizing property but insufficiently improved in non-flocculating property in many cases and sometimes caused flooding, precipitation of the mixed pigments and other undersirable problems when put to use.

Furthermore, a satisfactory non-fluocculating property will not be obtained in copper phthalocyanine if the copper phthalocyanine be incorporated with a condensate of a chlorosulfonic group-containing copper phthalocyanine with a primary amine as disclosed in U.S. Pat. No. 2,861,005.

The primary object of this invention is to provide phthalocyanine pigment compositions freed of the aforesaid defects and generally improved in noncrystallinity and non-flocculating property.

The noncrystalline and non-flocculating phthalocyanine pigment composition of this invention consists essentially of 100 parts by weight of copper phthalocyanine and 0.5 – 30 parts by weight of a copper phthalocyanine derivative represented by the general formula (I)

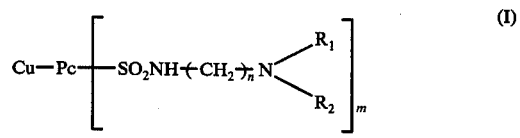

wherein Cu - Pc - is the residue of copper phthalocyanine, $m$ and $n$ are each an integer of from 1 to 4, $R_1$ and $R_2$ are each a substituted or non-substituted alkyl group or a heterocyclic group containing the nitrogen atom appearing in the formula.

The phthalocyanine pigment composition of this invention may be obtained by mixing said copper phthalocyanine with said copper phthalocyanine derivative and, if desired, further with suitable additives.

The copper phthalocyanine derivative represented by the general formula may be produced by chlorination reacting a copper phthalocyanine derivative having 1 – 4 chlorosulfonic groups introduced thereinto with an amine represented by the following general formula (II)

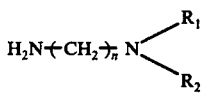

$$H_2N + CH_2 \rightarrow_n N \begin{matrix} R_1 \\ R_2 \end{matrix} \qquad (II)$$

wherein n R$_1$ and R$_2$ are as defined in the formula (I), in the presence or absence of a solvent at a temperature of 0° – 200° C.

The amines which may be used in the said reaction include N,N-dimethylaminopropylamine, N,N-diethylaminopropylamine, N,N-dibutylaminopropylamine, N,N-dimethylaminoethylamine, N,N-diethylaminoethylamine, N-aminopropylmorpholine, N-aminoethylpiperidine, N-aminoethylpyrrolidine, N,N-diisobutylaminopentylamine, N,N-diethylaminopentylamine, N,N-dimethylaminopentylamine and N-aminopropyl-2-pipecoline.

It is undesirable that the chlorosulfonated copper phthalocyanine be reacted with an amine having active hydrogen at its terminals represented by the following general formula (III)

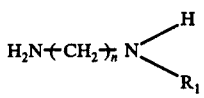

$$H_2N + CH_2 \rightarrow_n N \begin{matrix} H \\ R_1 \end{matrix} \qquad (III)$$

wherein n is an integer of 1 – 4 and R$_1$ is an alkyl group, since the use of the said amine will not yield reaction products in uniform quality thereby making it difficult to obtain such industrial products in reliably uniform quality.

According to this invention, blends of the copper phthalocyanine derivative of the formula (I) with copper phthalocyanine pigment may be obtained by mixing the components together each in dried powder, pressed cake or slurry form, by dissolving or suspending the components separately or jointly in concentrated sulfuric acid and then pouring the resulting solution or suspension into water to precipitate the components or by triturating the pigment derivative with a crude copper phthalocyanine mechanically.

As previously mentioned, it is necessary that the copper phthalocyanine composition of this invention should contain 0.5 – 30, preferably 5 – 15, parts by weight of the copper phthalocyanine derivative of the formula (I) per 100 parts by weight of the copper phthalocyanine pigment since the addition of less than 0.5 parts of the derivative of the formula (I) will not be effective in inhibiting the growth and transformation of crystals in the pigment while the addition of more than 30 parts by weight thereof will raise problems as to the solvent resistance and of the pigment.

The copper phthalocyanine pigments which may be used in this invention include those in α-type, β-type and other crystal form as well as those containing one or two halogen atom substituents.

According to this invention, 100 parts by weight of β-type copper phthalocyanine are blended with 0.5 – 30 parts by weight of the copper phthalocyanine derivative of the formula (I) to obtain a copper phthalocyanine composition which has improved non-flocculating property and will not exhibit the growth of crystals and changes in color tone and tinting strength when immersed in an aromatic solvent at room temperature or at an elevated temperature of 100° – 140° C. In addition, the copper phthalocyanine derivative of the formula (I) will also be effective in inhibiting the crystal transformation and flocculation of α-type copper phthalocyanine pigment when the derivative in incorporated in the β-type pigment; more particularly, a pigment composition obtained by blending 100 parts by weight of α-type copper phthalocyanine with 0.5 – 30 parts by weight of the copper phthalocyanine of the formula (I), will not exhibit the transformation of crystals and changes in color tone and tinting strength when immersed in an organic solvent at room temperature or even at an elevated temperature of 100° – 140° C, and the pigment composition has remarkably improved non-flocculating property and satisfactory fluidity and will not cause flooding and precipitation of pigments when used together with other kinds of pigments in a paint.

It is not clear why the pigment composition of this invention has been satisfactorily inhibited from crystal transition and pigment flocculation, but it could be due to the presence of the tertiary amino group in the sulforamide group of the copper phthalocyanine derivative used in this invention as is seen from the chemical formula (I). This has been substantiated by the present inventors' experiment which shows that the addition of a copper phthalocyanine derivative represented by the following general formula (IV)

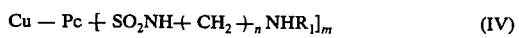

$$Cu - Pc + SO_2NH + CH_2 \rightarrow_n NHR_1]_m \qquad (IV)$$

wherein Cu - Pc - , n, m and R$_1$ are as defined in the formula (I), in substitution for the addition of the copper phthalocyanine derivative of the formula (I), exhibited unsatisfactory inhibition of crystal transformation and pigment flocculation.

The copper phthalocyanine pigment compositions of this invention are stable without causing the transformation and growth of crystals. Thus, the use of the composition as the pigment component in the preparation of various paints such as nitrocellulose lacquer, an aminoalkyd resin baking paint, an air drying alkyd resin paint and an acrylic resin paint, will enable the various paints to exhibit lower paint viscosity, lower structural viscosity, smaller change in viscosity with the lapse of time and more satisfactory fluidity than ordinary or conventional phthalocyanine pigments. Furthermore, the pigment composition of this invention will cause no flooding and precipitation of pigments in a paint when used, together with other pigments such as titanium dioxide, carbon black and rouge, in the paint. When used in the preparation of a publication gravure ink, packaging gravure ink gravure or the like, the pigment composition will improve the gravure ink in fluidity thereby obtaining excellent printing effects.

This invention will be better understood by the following Examples in which all parts are by weight unless otherwise specified.

EXAMPLE 1

A four-necked flask provided with a stirrer, refluxing condenser and thermometer was charged with 10 parts of copper phthalocyanine and 100 parts of chlorosulfonic acid to perfectly dissolve the former in the latter, and then further charged with 21 parts of thionyl chloride. The resulting mixture was slowly raised in temperature and maintained at 112° – 113° C for 4 hours. After the mixture was allowed to cool, it was poured into ice, filtered and then washed with iced water to obtain pasty matter. The paste so obtained was introduced into a four-necked provided flask with a refluxing condenser, after which 100 parts of water and 21 parts of N,N-diethylaminoethylamine were introduced into the same flask to form a mixture which was agitated at room temperature for 12 hours and then heated to 60° C for one hour. After the end of the reaction, the reaction mixture was filtered, water washed and dried to obtain a copper phthalocyanine derivative in the form of blue powder. This blue powder was subjected to elemental analysis, and the analysis obtained was found to be approximate to the analysis for a copper phthalocyanine derivative into which have been introduced about three groups each represented by the following formula

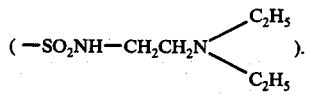

Five parts of the thus-obtained copper phthalocyanine derivative in powder form were blended with 100 parts of crystalline flocculating α-type copper phthalocyanine pigment to produce a homogeneous mixture. Five parts of this mixture and 100 parts of xylene were placed in a 2000-ml Erlenmeyer flask and the resulting mixture was boiled under reflux for 5 hours. After being allowed to cool, the mixture was filtered to separate the pigments from the xylene and the pigments so separated were dried and subjected to X-ray diffraction to investigate the crystal form thereof with the result that the transformation of crystals to β-type crystal form was not appreciated. In addition, electromicroscopic photographs show that the mixture subsequent to the boiling in the xylene was not differentiated from that prior to said boiling in crystal form and size, in color tone displayed when the mixture was kneaded with linseed oil and in tinting strength.

The aforesaid mixture (16.5 parts) of copper phthalocyanine derivative and α-type copper phthalocyanine pigment was kneaded with 283.5 parts of alkyd-melamine resin varnish (comprising 7 parts of an alkyd resin and 3 parts of a melamine resin, the alkyd and melamine resins being supplied under the trademarks of Phthalkyd 133 - 60 and Melan 20 - 1 by Hitachi Kasei Co., Ltd., Japan) on a one-liter ball mill to form a paint which was measured for viscosity at 25° C upon completion of the kneading by the use of a BM type viscosimeter. The result is shown in Table 1 which indicates that the paint had practically no structural viscosity.

Table 1

| BM type viscosimeter | Number of rotation (rpm) | 6 | 12 | 30 | 60 |
|---|---|---|---|---|---|
| | Viscosity (cps) | 940 | 935 | 935 | 930 |

After having been allowed to stand for one week, the paint so formed was again measured for viscosity by the use of the same BM type viscosimeter with the result being shown in Table 2.

Table 2

| Number of rotation (rpm) | 6 | 12 | 30 | 60 |
|---|---|---|---|---|
| Viscosity (cps) | 1050 | 1000 | 980 | 960 |

In addition, 22 parts of a white paint (A) were prepared from 5.5 parts of titanium dioxide and 16.5 parts of the alkyd-melamine resin varnish, while 10 parts of a paint (B) were prepared from 0.55 parts of a mixture of the copper phthalocyanine derivative and α-type copper phthalocyanine and 9.45 parts of the alkyd-melamine resin varnish. Then, 22 parts of the white paint (A) were kneaded with 10 parts of the paint (B) to form a tinted paint (C) of 1/10 cut ("1/10 cut" means that the ratio between the amount of the pigment mixture used and that of the titanium dioxide used is 0.55 parts/5.5 parts = 1/10) which was mixed with xylene in such an amount that the resulting diluted paint (D) had a viscosity expressed in terms of Ford Cup No. 4, 20" - 22" (25° C).

Separately, 6.19 parts of titanium dioxide, 0.17 parts of carbon black, 0.69 parts of rouge and 18.94 parts of the alkyd-melamine resin varnish were blended together to form 26 parts of a mixed tinted paint (E), while 0.75 parts of the mixture of the copper phthalocyanine derivative and α-type copper phthalocyanine were blended with 9.25 parts of the alkyd-melamine resin varnish to form 10 parts of a paint (B'). Then, the paints (E) and (B') were blended together to form a paint (F) which was then mixed with xylene in such an amount that the resulting diluted paint (G) had a viscosity in terms of Ford Cup No. 4, 20" - 22" (25° C). The two paints (D) and (G) so prepared were placed in test tubes to observe how they caused flocculation, respectively, but they did not cause flocculation and precipitation of the pigment even one month later. In this case, on the other hand, the use of a copper phthalocyanine derivative prepared in accordance with the procedure of Example 1 of U.S. Pat. No. 3,920,469 in substitution for the phthalocyanine derivative according to this invention, resulted in causing flocculation and precipitation of the pigments one month later.

Figure 2:
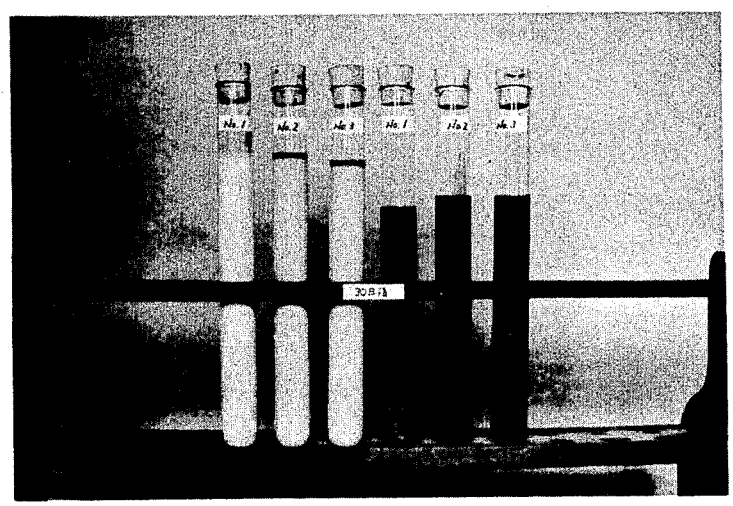

In the accompanying drawing, FIGS. 1 and 2 are each a photographic view of paints subjected to said test-tube tests. The compositions of paints Nos. 1 - 3 appearing on the left and right sides of FIG. 1 were as indicated below.

Left side
Paint No. 1
Mixture
{ Base paint 10 parts (α-type copper phthalocyanine 0.55 parts, alkyd-melamine resin varnish 9.45 parts)
White paint 22 parts (TiO₂ 5.5 parts, alkyd-melamine resin varnish 16.5 parts)
Viscosity: Ford Cup No. 4, 20"–22" (adjusted with xylene)

Paint No. 2
Mixture
{ Base paint 10 parts (α-type copper phthalocyanine 0.524 parts, copper phthalocyanine derivative of U.S. Patent 3,920,469 0.026 parts, alkyd-melamine resin varnish 9.45 parts)
White paint (same as above) 22 parts
Viscosity: Same as above Paint No. 3
Mixture
{ Base paint 10 parts (α-type copper phthalocyanine 0.524 parts, copper phthalocyanine derivative of Example 1 0.026 parts, alkyd-melamine resin varnish 9.45 parts)
Viscosity: Same as above Right side
Paint No. 1
Mixture
{ Base paint 10 parts (α-type copper phthalocyanine 0.75 parts, alkyd-melamine resin varnish 9.25 parts)
Mixed tinted paint (same as mixed tinted paint (E) of Example 1) 26 parts
Viscosity: Same as above Paint No. 2
Mixture
{ Base paint parts (α-type copper phthalocyanine 0.714 parts, copper phthalocyanine derivative of U.S. Patent 3,920,469 0.036 parts, alkyd-melamine resin varnish 9.25 parts
Mixed tinted paint (same as above) 26 parts
Viscosity: Same as above Paint No. 3    Base paint 10 parts (α-type copper

| Right side | phthalocyanine 0.714 parts, copper |
|---|---|
| Mixture | phthalocyanine derivative of Example 1, alkyd-melamine resin varnish 9.25 parts Mixed tinted paint (same as above) 26 parts Viscosity: Same as above |

FIG. 1 shows the paints immediately after their preparation and FIG. 2 shows the same one month after their preparation. In each of the left and right sides of each of FIGS. 1 and 2, paint No. 1 did not contain a copper phthalocyanine derivative, paint No. 2 contained the copper phthalocyanine derivative prepared in accordance with U.S. Pat. No. 3,920,469 and paint No. 3 contained the copper phthalocyanine derivative of Example 1 according to the present invention.

EXAMPLE 2

Chlorosulfonic copper phthalocyanine was reacted with N, N-dimethylaminoethylamine in the same manner as in Example 1 to produce a compound represented by the following formula

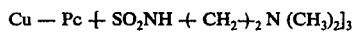

Cu — Pc $+$ SO$_2$NH $+$ CH$_2$$+_2$ N (CH$_3$)$_2$]$_3$ wherein Cu—Pc— is the residue of copper phthalocyanine.

One half (0.5) part of the compound so produced and 16 parts of β-type copper phthalocyanine pigment obtained by mechanical trituration were used in the preparation of an alkyd-melamine resin baking paint in the same manner as in Example 1. The baking paint so prepared had low viscosity and exhibited slight structural viscosity as compared with a paint containing β-type copper phthalocyanine alone as the pigment as is seen from the following Table 3.

Table 3

| Number of rotation | rpm | 6 | 12 | 30 | 60 |
|---|---|---|---|---|---|
| β-type copper phthalocyanine pigment, viscosity | cps | 3500 | 2500 | 2200 | 1750 |
| Mixture of β-type copper phthalocyanine pigment and copper phthalocyanine derivative thereof, viscosity | cps | 940 | 930 | 925 | 925 |

Each of these was blended with the white paint to obtain a tinted paint of 1/10 cut and a mixed tinted paint in the same manner as in Example 1. The paints so obtained were tested in the same manner as in Example 1 with the result that the mixed tinted paint was more satisfactory in being inhibited from causing flocculation and precipitation of the pigments.

The aforesaid mixture of the phthalocyanine pigment and the phthalocyanine derivative exhibited satisfactory fluidity without flocculation when used in nitrocellulose lacquer, an air drying alkyd resin paint, an acrylic resin paint and gravure printing ink.

EXAMPLE 3

A crude copper phthalocyanine was dissolved in concentrated sulfuric acid and poured into water to re-precipitate α-type copper phthalocyanine which was washed with water and pressed to obtain a pressed cake. One hundred parts of the pressed cake as a pure pigment were re-slurried in 1,200 parts of water. Separately, 5 parts of chlorosulfonated copper phthalocyanine and 7 parts of N,N-diethylaminopropylamine were reacted together in the same manner as in Example 1 to form a copper phthalocyanine derivative which was filtered off and washed with water thereby obtaining a paste. The paste so obtained was added to the aforesaid re-slurried pressed cake and agitated for one hour to form a homogeneous mixture which was filtered off, dried and pulverized thereby obtaining a pigment composition embodying this invention. The pigment composition so obtained was noncrystalline and enabled various paints and gravure painting inks to have satisfactory fluidity without causing flocculation when it was contained as the pigments in said various paints and inks.

EXAMPLE 4

Ten parts of chlorosulfonated copper phthalocyanine and 17 parts of N-aminopropylmorpholine were reacted together in 200 parts of water to produce a copper phthalocyanine derivative represented by the following formula

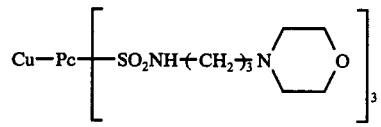

wherein Cu- Pc- is the residue of copper phthalocyanine.

The procedure of Example 1 was followed except that the copper phthalocyanine derivative so produced was substituted for the copper phthalocyanine derivative of Example 1 to obtain a desired pigment composition which was noncrystalline and non-flocculating.

EXAMPLES 5 - 11

The procedure of Example 1 was followed using each of the amines shown in the following Table 4 in substitution for the N, N-diethylaminoethylamine of Example 1.

Table 4

| Example | | Amine used |
|---|---|---|
| Example | 5 | N,N-dimethylaminopropylamine |
| " | 6 | N,N-dibutylaminopropylamine |
| " | 7 | N-aminoethylpiperidine |
| " | 8 | N-aminoethylpyrrolidine |
| " | 9 | N,N-diisobutylaminopentylamine |
| " | 10 | N,N-diethylaminopentylamine |
| " | 11 | N-aminopropyl-2-pipecoline |

What is claimed is:

1. A copper phthalocyanine pigment composition consisting essentially of 100 parts by weight of copper phthalocyanine and 0.5 - 30 parts by weight of a copper phthalocyanine derivative having the following general formula

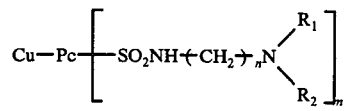

wherein Cu - Pc - is the residue of copper phthalocyanine, $m$ and $n$ are each an integer of from 1 to 4, and $R_1$ and $R_2$ are each a substituted or non-substituted alkyl group or a heterocyclic group containing the nitrogen atom of the formula.

2. A copper phthalocyanine pigment composition according to claim 1, wherein the copper phthalocyanine derivative is one prepared by dechlorination reacting a chlorosulfonated copper phthalocyanine derivative containing 1 – 4 chlorosulfonic groups with an amine having the following general formula

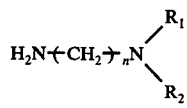

wherein $n$, $R_1$ and $R_2$ are as defined in claim 1, at a temperature of 0° – 200° C in the presence or absence of a solvent.

3. A copper phthalocyanine pigment composition according to claim 2, wherein the amine is s member selected from the group consisting of N,N-dimethylaminopropylamine, N,N-diethylaminopropylamine, N,N-dibutylaminopropylamine, N,N-dimethylaminoethylamine, N,N-diethylaminoethylamine, N-aminopropylmorpholine, N-aminoethylpiperidine, N-aminoethylpyrrolidine, N,N-diisobutylaminopentylamine, N,N-diethylaminopentylamine, N,N-dimethylaminopentylamine and N-aminopropyl-2-pipecoline.